US012801155B2

(12) United States Patent
Yamada

(10) Patent No.: US 12,801,155 B2
(45) Date of Patent: Nov. 17, 2026

(54) HUMAN-MACHINE COOPERATIVE CONTROL SYSTEM AND HUMAN-MACHINE COOPERATIVE CONTROL METHOD

(71) Applicant: Hitachi, Ltd., Tokyo (JP)

(72) Inventor: Hiroyuki Yamada, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 76 days.

(21) Appl. No.: 18/558,414

(22) PCT Filed: Mar. 7, 2022

(86) PCT No.: PCT/JP2022/009778
§ 371 (c)(1),
(2) Date: Nov. 1, 2023

(87) PCT Pub. No.: WO2022/244393
PCT Pub. Date: Nov. 24, 2022

(65) Prior Publication Data

US 2024/0231381 A1 Jul. 11, 2024

(30) Foreign Application Priority Data

May 18, 2021 (JP) ................................ 2021-083577

(51) Int. Cl.
*G05D 1/622* (2024.01)
*G05D 105/05* (2024.01)
*G05D 105/28* (2024.01)

(52) U.S. Cl.
CPC ......... *G05D 1/637* (2024.01); *G05D 2105/05* (2024.01); *G05D 2105/28* (2024.01)

(58) Field of Classification Search
CPC ............... G05D 1/637; G05D 2105/05; G05D 2105/28; G05D 1/249; G05D 2107/90;
(Continued)

(56) References Cited

U.S. PATENT DOCUMENTS 9,230,419 B2 * 1/2016 Beggs .................... G08B 21/18
2017/0116487 A1 * 4/2017 Yamazaki ........... G05D 1/0251
(Continued)

FOREIGN PATENT DOCUMENTS

JP 2017-228284 A 12/2017
JP 2018-202531 A 12/2018
(Continued)

OTHER PUBLICATIONS

WO2020189702A1 English Translation (Year: 2020).*
(Continued)

*Primary Examiner* — Tyler D Paige
*Assistant Examiner* — Alexander V Gentile
(74) *Attorney, Agent, or Firm* — Volpe Koenig

(57) ABSTRACT

A system for presenting information to a human to avoid dangers such as collisions, without hindering the respective movement of the human and an autonomous machine. The human-machine cooperative control system manages each movable region so that the human and the autonomous machine do not collide. The system comprises a moving body position measurement unit comprising at least sensor for measuring the position of moving bodies, including a human and a machine; a moving body motion prediction unit for predicting future motion of a subject moving body on the basis of a moving body position; an exclusive management unit for planning a movable region for each moving body on the basis of a planned route for the unmanned machine and a moving body predicted motion obtained from the moving body motion prediction unit; and an information presentation unit for presenting information about the movable region for the human.

13 Claims, 7 Drawing Sheets

(58) Field of Classification Search
CPC ............... G05D 1/633; G05D 2107/70; G05D 2109/10; G08G 1/005; G08G 1/04; G08G 1/164; G08G 1/166
See application file for complete search history.

(56) References Cited

U.S. PATENT DOCUMENTS

| | | | | |
|---|---|---|---|---|
| 2017/0337820 | A1* | 11/2017 | Glatfelter | G08G 1/166 |
| 2018/0349654 | A1 | 12/2018 | Takeshima et al. | |
| 2019/0105788 | A1* | 4/2019 | Pilz | B25J 9/1676 |
| 2019/0161274 | A1* | 5/2019 | Paschall | G05D 1/0246 |
| 2020/0192388 | A1* | 6/2020 | Zhang | G05D 1/648 |
| 2022/0019949 | A1* | 1/2022 | Shobu | G06Q 50/04 |
| 2022/0215666 | A1 | 7/2022 | Furuhata | |
| 2022/0221869 | A1 | 7/2022 | Matsumoto | |
| 2024/0241523 | A1* | 7/2024 | Yasuda | G05D 1/65 |

FOREIGN PATENT DOCUMENTS

| | | | | |
|---|---|---|---|---|
| JP | 2019-069509 | A | 5/2019 | |
| JP | 2020-095617 | A | 6/2020 | |
| JP | 2020-177328 | A | 10/2020 | |
| JP | 6833111 | B1 | 2/2021 | |
| WO | WO-2020189702 | A1 * | 9/2020 | G08G 5/80 |

OTHER PUBLICATIONS

WO2020189702A1 English Translation of the Description (Year: 2020).*
International Search Report, PCT/JP2022/009778, May 10, 2022.

* cited by examiner

HUMAN-MACHINE COOPERATIVE CONTROL SYSTEM AND HUMAN-MACHINE COOPERATIVE CONTROL METHOD

TECHNICAL FIELD

The present invention relates to a human-machine cooperative control system and a human-machine cooperative control method for supporting a motion of a person for preventing a decrease in work efficiency without sacrificing safety when the person and an autonomous machine perform work in the same space.

BACKGROUND ART

In recent years, an automated system that automates human work and achieves labor saving and efficiency has been actively developed, and many automated systems are expected to be implemented in society in the future. Among the automated systems, in particular, regarding industrial vehicles, construction machines, and the like, there are many cases where a person (worker) who works exists in the surroundings. However, in a case where such machines are automated and autonomously operate, a measure such as isolation of the machine from the surrounding worker is generally taken from the viewpoint of safety during a period in which the machine perform an autonomous operation (for example, autonomous traveling).

As a conventional technique of such an automated system, for example, PTL 1 is a system and method for avoiding a collision between an object and a moving body such as a person in a factory or the like. In PTL 1, the position of the moving body is observed by a plurality of sensors, a moving direction of each moving body is specified based on the position of the moving body over time, an intersection area of the moving directions of at least two moving bodies is specified, and an alert is presented in the intersection area in a case where at least one moving body exists within a predetermined proximity range of the intersection area of at least two moving bodies. This conventional technique is a system for collision avoidance and contributes to maintaining a safe state. However, since information is presented to a person only after the risk of collision is predicted, there is a possibility that work efficiency is reduced by the person taking an action to avoid the collision.

CITATION LIST

Patent Literature

PTL 1: JP 2017-228284 A

SUMMARY OF INVENTION

Technical Problem

In the case of constructing the automated system described above, it is often difficult for the autonomous machine to autonomously perform all necessary work at the place without human hands, and there are many cases where the work of the worker is still necessary. For example, in a case where a forklift is taken as an example of an industrial vehicle, even though a load can be autonomously moved to another place, work of, for example, checking the state of the load and performing inspection may be performed manually. In addition, taking a hydraulic excavator as an example of the construction machine, there are many detailed works that has difficulty in being performed with the hydraulic excavator, and these works are manually performed. As described above, even though industrial vehicles, construction machines, and the like are automated in the future, it is considered that it takes a long period to completely eliminate the work of a person.

Under such circumstances, isolating the autonomous machine and the person from each other leads to a decrease in accident risk from the viewpoint of safety. For example, in a case where work of the autonomous machine and work of the person are provided in the same space, the work time in each target space is distinguished so that the autonomous machine and the person do not work in the same space at the same time.

On the other hand, in this case, since it is not possible to simultaneously perform necessary work at the same time, there is a problem that work efficiency is reduced. In addition, even if simultaneous work in the same space is possible, the autonomous machine decelerates or stops for safety each time the distance to a person is reduced, and the work efficiency also decreases. Therefore, in a case where a person and an autonomous machine simultaneously perform work in the same space, it is important how to construct a state in which safety is secured while preventing a decrease in work efficiency as much as possible.

In order to achieve both such safety and work efficiency, it is necessary not only to optimize the action of the autonomous machine but also to optimize the action of the worker who performs work in the same space. That is, in addition to achievement of target work, the autonomous machine is required to predict the action of the surrounding worker and to take a safe action such as avoiding a collision. However, it is desirable that the worker also understand the action of the autonomous machine and select the own action so as not to disturb the action of the autonomous machine as much as possible. Therefore, if necessary information can be presented to the worker and action selection can be supported, the autonomous machine and the worker can perform work in the same space while further preventing a decrease in work efficiency in a state where safety is ensured.

From the above description, the object to be achieved by the present invention is to provide a human-machine cooperative control system and a human-machine cooperative control method for making it easy for a person to take an optimum action in consideration of a state of a surrounding autonomous machine by presenting information to the person so that the person and the autonomous machine do not hinder the own movement and work as much as possible and a risk such as collision can be avoided, in order to prevent a decrease in work efficiency without sacrificing safety when the person and the autonomous machine perform work in the same space.

Solution to Problem

From the above description, in the present invention, “there is provided a human-machine cooperative control system that exclusively manages each movable area such that a person and an unmanned machine capable of autonomously moving do not collide with each other in a shared area, the human-machine cooperative control system configured to include a moving body position measurement unit that includes one or a plurality of sensors that measure a position of a moving body including the person and the unmanned machine, a moving body motion prediction unit that predicts a future motion of a target moving body from the position of the moving body measured by the moving body position measurement unit, an exclusion management unit that plans a movable area of each moving body based on a planned route of the unmanned machine and a moving body prediction motion obtained from the moving body motion prediction unit, and an information presentation unit that presents, to a target person, movable area information for a person among movable areas of moving bodies planned by the exclusion management unit".

Further, in the present invention, "there is provided a human-machine cooperative control method for exclusively managing each movable area such that a person and an unmanned machine capable of autonomously moving do not collide with each other in a shared area, the human-machine cooperative control method including measuring a position of a moving body including the person and the unmanned machine, predicting a future motion of a target moving body from the position of the moving body, planning a movable area of each moving body based on a planned route and a moving body prediction motion of the unmanned machine, and presenting, to a target person, movable area information for a person among movable areas of moving bodies".

Advantageous Effects of Invention

According to the present invention, when a person and an autonomous machine perform work in the same space, the person can easily take an action that prevents a decrease in work efficiency without sacrificing safety, and a balance between safety and work efficiency of the entire work site including the autonomous machine is optimized.

DESCRIPTION OF EMBODIMENTS

Hereinafter, an embodiment of the present invention will be described with reference to the drawings. Note that the following description shows specific examples of the contents of the present invention, and the present invention is not limited to these descriptions. Various changes and modifications can be made by those skilled in the art within the scope of the technical idea disclosed in this specification. In all the drawings for describing the present invention, components having the same function are denoted by the same reference signs, and the repetitive description thereof may be omitted.

EXAMPLES

A human-machine cooperative control system according to an example of the present invention will be described with reference to FIGS. 1 to 8.

Figure 1:
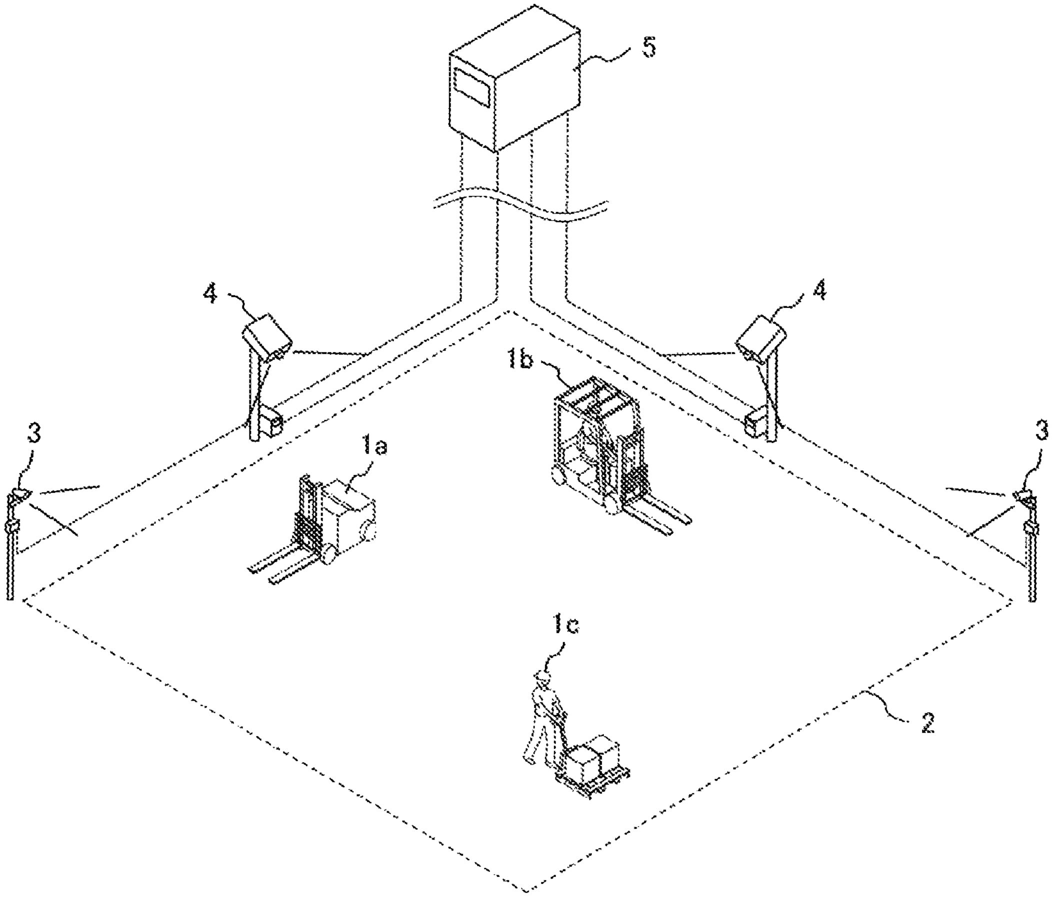
FIG. 1 is a diagram illustrating an overall configuration example of a human-machine cooperative control system according to an embodiment of the present invention.

FIG. 1 is an overall diagram illustrating a configuration example of the human-machine cooperative control system according to the example of the present invention. The human-machine cooperative control system mainly includes one or a plurality of sensor units 3, an information presentation device 4, one or a plurality of computers 5, and the like. The sensor units 3 and the computers 5 are communicably connected via a network.

In addition, there are a plurality of moving bodies 1 as control targets of the human-machine cooperative control system, and there is a shared area 2 as a control target area. The moving body 1 can be subdivided into, for example, an unmanned machine 1*a* that has an autonomous movement function and moves in an unmanned manner, a manned machine 1*b* that is operated and moved by a person, a worker 1*c*, and the like. The shared area 2 is an area where the unmanned machine 1*a*, and the manned machine 1*b* and/or the worker 1*c* perform work at the same time.

Among the moving bodies, a target task is assigned to the unmanned machine 1*a* by a control function (not illustrated), and the unmanned machine 1*a* plans an action and acts by itself in accordance with the task. In addition, in the present example, a site where the manned machine 1*b* represented by a forklift and a worker work in the same area is assumed. The task of the unmanned machine 1*a* is assigned by a control function in units such as carrying a cargo placed at a certain point to another point, for example. The unmanned machine 1*a* plans a moving route from a position at that time to a point in a task instruction by a route planning unit 101 (illustrated in FIG. 2) in the unmanned machine 1*a*, and the unmanned machine 1*a* autonomously travels along the planned route.

Figure 2:
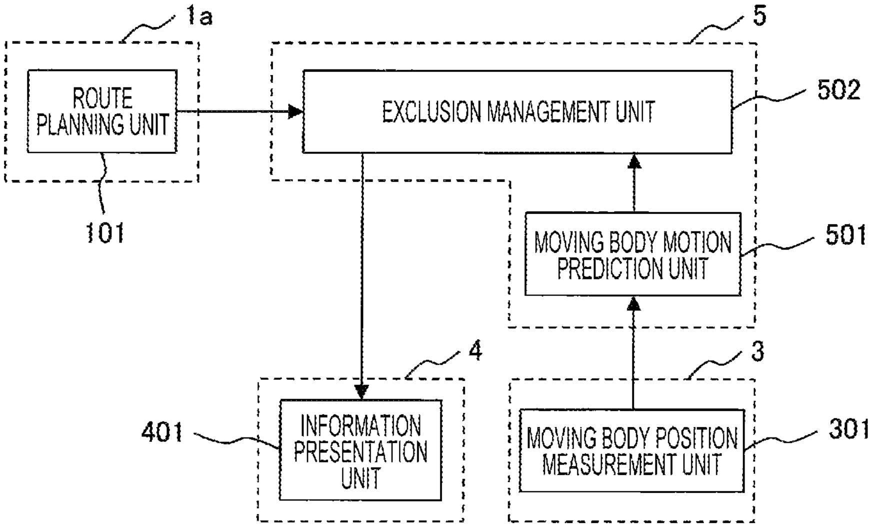
FIG. 2 is a diagram illustrating a processing function of the human-machine cooperative control system according to the embodiment of the present invention.

FIG. 2 is a block diagram illustrating a processing function of the human-machine cooperative control system according to the example of the present invention. The human-machine cooperative control system in FIG. 2 roughly includes four processing functions. The processing functions are processing functions of a moving body position measurement unit 301 in the sensor unit 3, processing functions of a moving body motion prediction unit 501 and an exclusion management unit 502 in the computer 5, and a processing function of an information presentation unit 401 in the information presentation device 4.

Among the processing functions, the moving body position measurement unit 301 has a function of detecting the moving body 1 and measuring the position thereof. The sensor unit 3 may be any sensor as long as the sensor can measure the position of the moving body 1. For example, the sensor unit may be a GPS or a beacon attached to the moving body 1, or a camera or a sensor such as LiDAR for estimating a position by matching with map information, or may be a camera or a sensor such as LiDAR, which is disposed to be fixed in an environment and directly measures the moving body 1. Furthermore, a plurality of the sensors may be combined.

In addition, although specific processing contents may change depending on the sensor configuration of the sensor unit 3, the moving body position measurement unit 301 is roughly classified into one that is installed on the moving body 1 itself and measures the own position and one that is installed on the moving body 1 or the environment side, detects the moving body 1 moving within a measurement range, and measures the position thereof. Note that the moving body position measurement unit 301 is not limited to specific measurement means, and any method may be used as long as the position of the moving body 1 can be acquired and transmitted.

The moving body motion prediction unit 501 has a function of receiving the position of the moving body 1 measured by one or a plurality of moving body position measurement units 301, performing integration process such as association of the same moving body when respectively receiving the positions of the plurality of moving bodies 1 from the plurality of moving body position measurement units 301, and predicting the motion up to the future for a predetermined time based on position information up to that time point of each moving body 1.

Specifically, there is a method of predicting a prediction motion as a probability density distribution representing the existence probability of the moving body 1 after a predetermined time. For example, probability density distributions of the moving body 1 at three future time points after 1 second, after 2.5 seconds, and after 5 seconds are calculated, and a value of an average and a standard deviation of the probability density distribution at each time point is set as the prediction motion.

The exclusion management unit 502 has a function of receiving the prediction motion of one or the plurality of moving bodies 1 predicted by the moving body motion prediction unit 501 and the planned route planned by the route planning unit 101 of the unmanned machine 1*a*, excluding an area in the shared area 2 such that the courses of the moving bodies 1 do not overlap, and determining the occupied area of each moving body 1. Details of this function will be described later.

The information presentation unit 401 has a function of transferring the occupied area of each moving body 1 determined by the exclusion management unit 502 to an operator of the manned machine 1*b* and/or the worker 1*c*. Details of this function will be described later.

Figure 3:
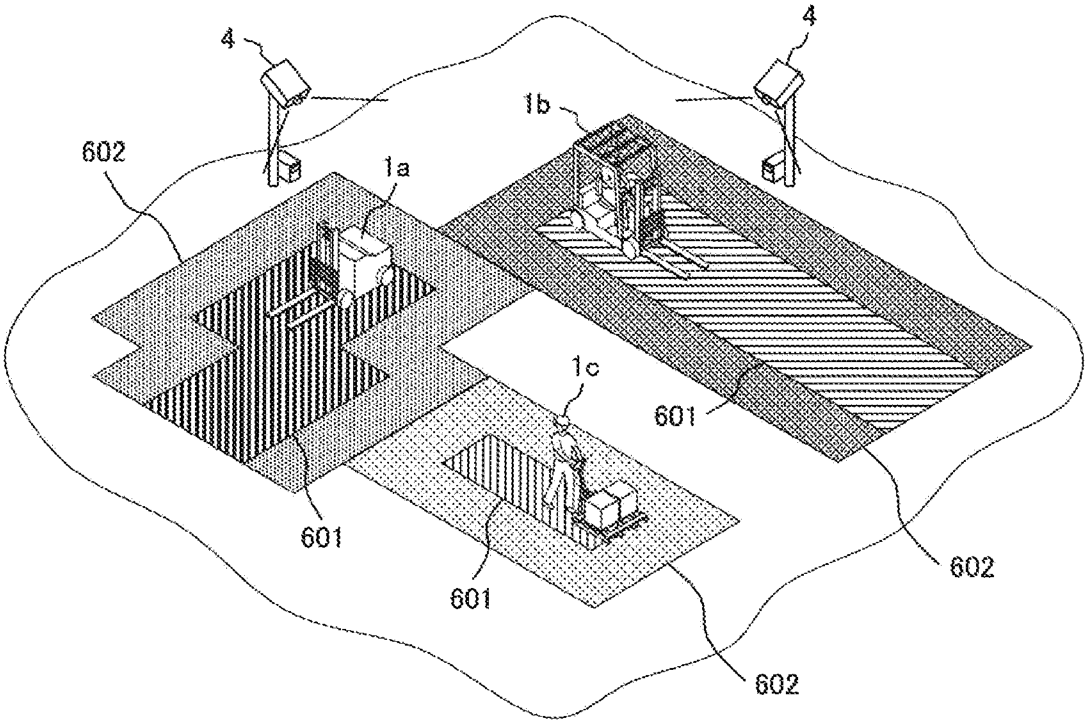
FIG. 3 is a diagram illustrating a presentation example of information to be transferred to a person by an information presentation unit.

FIG. 3 illustrates a presentation example of information to be transferred to the operator of the manned machine 1*b* and/or the worker 1*c* by the information presentation unit 401. An occupied area 601 of each moving body 1 determined by the exclusion management unit 502 is projected on the ground by the information presentation device 4 including a projector, and each moving body 1 moves so as not to go out from the occupied area 601 displayed on the ground. In this manner, the area is excluded such that the moving bodies 1 do not approach each other too closely. As a result, even though a person and a machine that autonomously operates perform work in the same area, it is possible to reduce the risk of collision.

In the present example, the information presentation device 4 is assumed to be a projector. The information presentation device 4 is not limited to the projector. The information presentation device 4 may display the occupied area 601 by using a light-emitting object such as a display or a light buried in advance on the ground. Alternatively, a display device may be held or worn by a person and the occupied area 601 may be displayed on the display device. In particular, if an eyeglass-type device having an augmented reality function of superimposing and displaying the occupied area 601 in a surrounding environment is used, information equivalent to information displayed on the ground can be acquired with the same sense without displaying anything on the ground, and it is possible to prevent a decrease in work efficiency as compared with a case where the information is simply displayed on the display device held by a person. In short, any means may be used as long as the occupied area set on the ground of the shared area or the preferential area described later can be recognized by the worker.

FIG. 3 illustrates an example in which a preferential area 602 is displayed in addition to the occupied area 601. The preferential area 602 is determined by the exclusion management unit 502 similarly to the occupied area 601, and is configured to surround the outside of the occupied area 601. The preferential area 602 is in a state where the priority right that allows occupying of the area next is obtained. It is not possible for the other person to occupy or preferentially acquire the area during a period in which the preferential area 602 is acquired. The preferential area 602 also has a role of providing a buffer so that occupied areas of different moving bodies 1 are not adjacent to each other. As a result, the risk of entering the occupied area 601 of another person at the moment of deviating from the own occupied area 601 is reduced. The occupied area 601 and the preferential area 602 are displayed in different colors and patterns so that three types of the unmanned machine 1*a*, the manned machine 1*b*, and the worker 1*c* can be distinguished.

Figure 4:
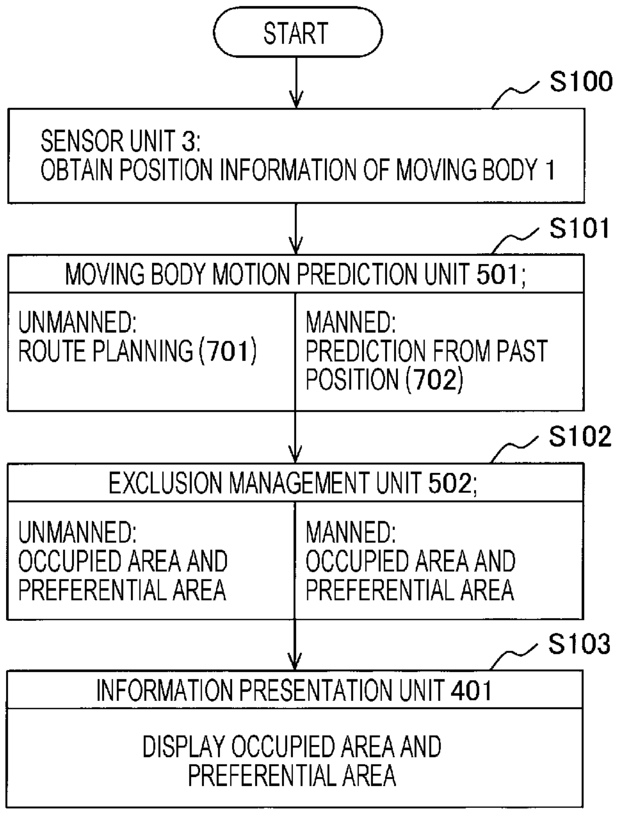
FIG. 4 is a diagram illustrating a flow of a series of processing of the human-machine cooperative control system configured by using a computer.

FIG. 4 is a diagram illustrating a flow of a series of processing of the human-machine cooperative control system configured by using a computer. In FIG. 4, in a first processing step S100, position information of a moving body 1 measured by the sensor unit 3 is obtained.

Then, in a processing step S101, the moving body motion prediction unit 501 predicts the actions of the manned and unmanned moving bodies 1. In the case of the manned moving bodies 1*b* and 1*c*, for example, the position at a future time point (for example, 1 second later) is estimated from the past position at the past time point which is 1 second or 2 seconds before and the current position at the current time point. In the case of the unmanned moving body 1*a*, action prediction for the current and future positions in the route planned by the route planning unit 101 is performed.

In a processing step S102, the exclusion management unit 502 determines an occupied area and a preferential area of each moving body 1 by using the planned routes and/or the prediction motions for all the moving bodies 1 existing in the shared area 2.

In a processing step S103, information presentation of the occupied area and the preferential area in the shared area 2 is performed by the information presentation unit 401 using a method allowing a person to perform recognition.

Figure 5:
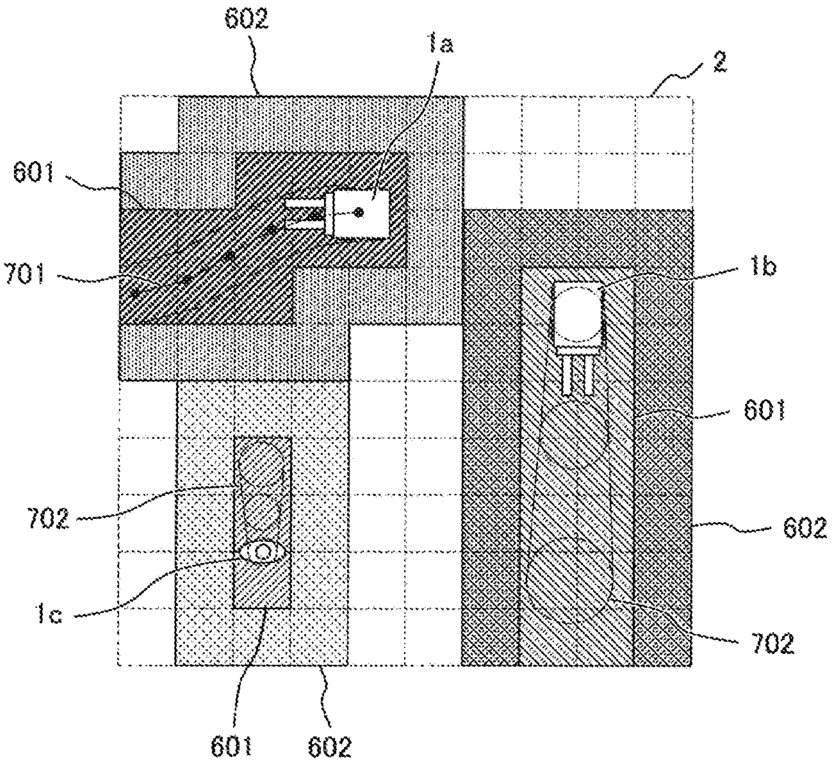
FIG. 5 is a diagram illustrating a presentation example of information in a case where occupied areas and preferential areas of a plurality of moving bodies do not interfere with each other.
Figure 6:
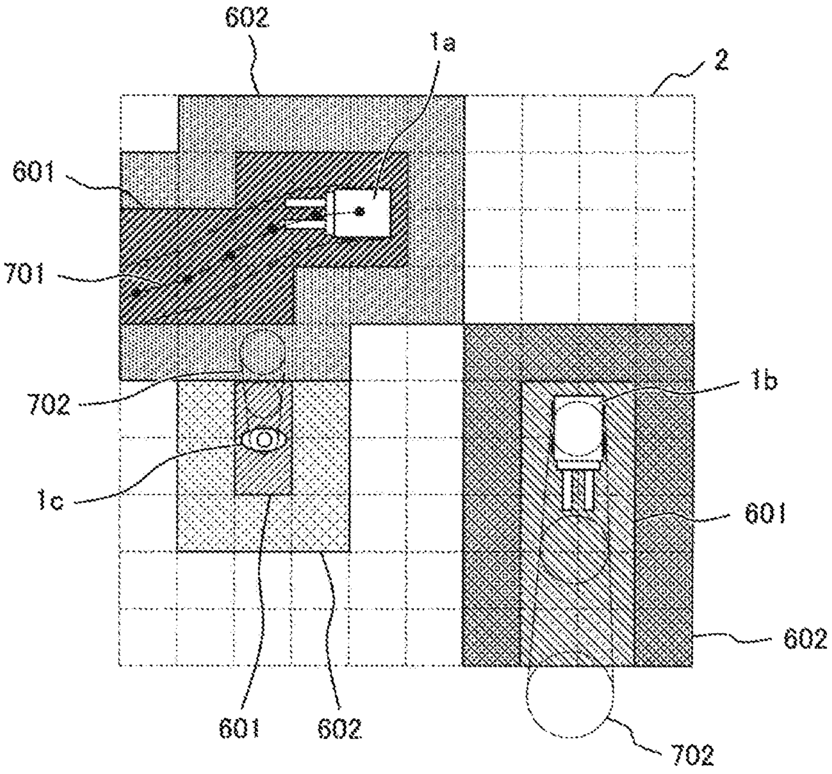
FIG. 6 is a diagram illustrating a presentation example of information in a case where preferential areas of moving bodies overlap and interfere with each other.
Figure 7:
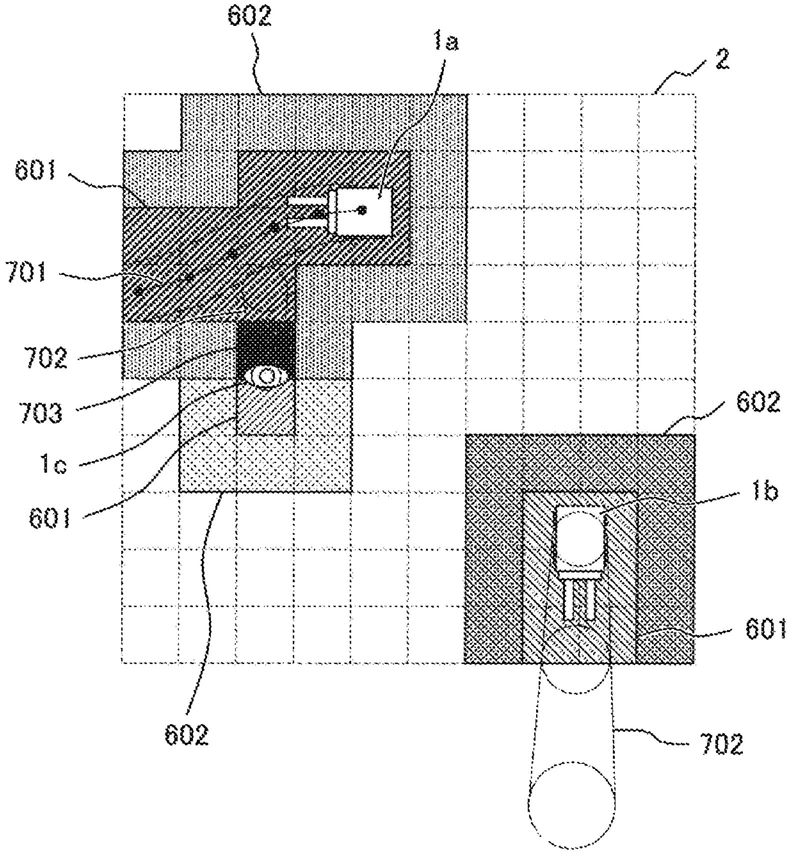
FIG. 7 is a diagram illustrating a presentation example of information in a case where occupied areas of moving bodies overlap and interfere with each other.

Thus, area display as illustrated in FIGS. 5 to 7 is performed in the shared area 2. Note that FIG. 5 illustrates an information presentation example in a case where occupied areas and preferential areas of a plurality of moving bodies do not interfere with each other, FIG. 6 illustrates an information presentation example in a case where preferential areas of moving bodies overlap and interfere with each other, and FIG. 7 illustrates an information presentation example in a case where occupied areas of moving bodies overlap and interfere with each other.

In order to enable display of the information presentation example, the exclusion management unit 502 functions more specifically as follows. First, the exclusion management unit 502 receives a prediction motion 702 for the manned moving bodies 1*b* and 1*c* from the moving body motion prediction unit 501. In the display example of FIG. 5, the prediction motion 702 is at the illustrated position for each moving body 1, and is configured by the average value and the standard deviation of the distribution obtained from the probability density distribution indicating the prediction position after 0 second, 1.5 seconds, and 3 seconds. FIGS. 5 to 7 illustrate the prediction motion 702 by a circle having the average value as the center and the standard deviation as the radius. Note that the prediction position after 0 seconds is the estimation position at that time.

Further, the exclusion management unit 502 receives a planned route 701 from the route planning unit 101 of the unmanned machine 1*a*. In the display example of FIG. 5, the planned route 701 is at the illustrated position, and is represented by position information arranged in time series from the current position, a set of straight lines and curved lines, or the like, and indicates the course followed by the unmanned machine 1*a*. Note that the exclusion management unit 502 can also receive size information such as the own length and width in addition to the planned route 701 for the unmanned machine 1*a*, thereby serving as a reference for determining the size of the occupied area 601.

Furthermore, the exclusion management unit 502 may change the size of the occupied area 601 for each moving body from attribute information of each moving body, a motion history of each moving body, and the like, which have been set in advance. For example, the occupied area 601 can be set relatively small for a worker having sufficient experience to improve work efficiency, and the occupied area 601 can be set relatively large for a worker not having sufficient experience to further reduce the risk of an accident. In addition, for a worker who tends to take an action having a difficulty in being predicted, that is, a worker whose matching degree between the predicted motion and the actual motion is low, the occupied area 601 can be set relatively large according to the low matching degree to further reduce the risk of an accident.

The exclusion management unit 502 determines the occupied area 601 and the preferential area 602 of each moving body 1 by using the planned routes 701 and/or the prediction motions 702 for all the moving bodies 1 existing in the shared area 2, as illustrated in FIG. 5. These areas are preferably determined in units of division areas obtained by dividing the shared area 2 in a lattice shape. This is to reduce a calculation load of the exclusion management unit 502. If the size of the division area is large, the calculation load is reduced, and the distance between the moving bodies 1 is increased, which leads to reduction of the accident risk such as collision. However, there is a possibility that the number of moving bodies 1 that can exist (work) at the same time in the shared area 2 is reduced, and work efficiency is reduced. In a case where the size of the division area is small, there is a possibility that the calculation load increases, the distance between the moving bodies 1 becomes close, and the accident risk such as collision increases. However, the number of moving bodies 1 that can exist (work) at the same time in the shared area 2 increases, and the work efficiency increases. Therefore, the size of the division area is determined by the calculation performance of the computer 5 and the balance between the safety and the work efficiency.

In addition, the exclusion management unit 502 preferably has the functions and characteristics as follows. For example, it is preferable to have an area deviation prevention function of transmitting movable area information for the unmanned machine 1*a* among the movable areas (occupied area and preferential area) of the moving bodies 1 planned by the exclusion management unit 502 to the target unmanned machine 1*a*, and limiting traveling so that the unmanned machine does not enter an area other than the occupied area. In addition, regarding the planned route of the unmanned machine 1*a* and the moving body prediction motion obtained from the moving body motion prediction unit 501, the movable area of each moving body is preferably planned based on the planned route and/or the moving body prediction motion for a predetermined time length. Furthermore, in a case where the planned route and/or the moving body prediction motion overlap the same division area, the exclusion management unit 502 preferably determines the division area as the movable area for one unmanned machine or moving body based on a predetermined priority order. In addition, FIGS. 5 to 7 illustrate examples of the occupied area 601 and the preferential area 602 determined by the exclusion management unit 502 in a state where there are one unmanned machine 1*a*, one manned machine 1*b*, and one worker 1*c* in the shared area 2. As the process proceeds from FIG. 5 to FIG. 7, a state in which the time has elapsed in the same situation is illustrated.

Figure 8:
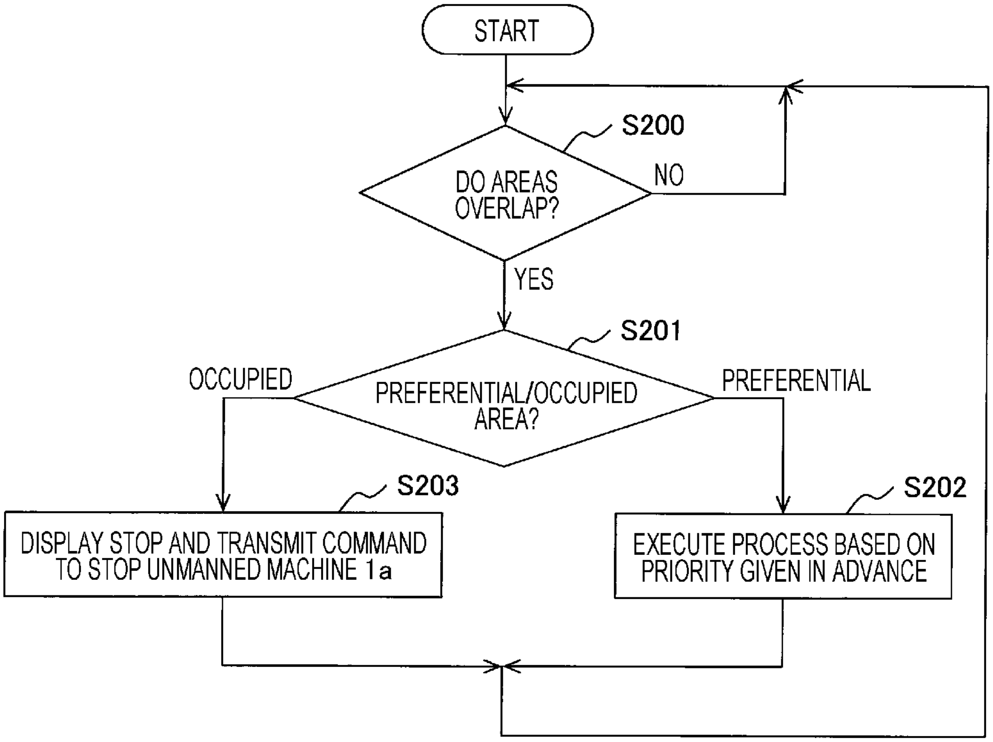
FIG. 8 is a diagram illustrating a concept of monitoring mutual movement of a plurality of moving bodies in a shared area and performing control protection.

Next, a concept of monitoring mutual movement of the plurality of moving bodies 1 in the shared area 2 and performing control protection will be described with reference to FIG. 8 by using a series of these diagrams. In the flow of FIG. 8, a processing step S200 is a process in the state of FIG. 5 (state where no area overlaps). First, in the processing step S200, whether or not the areas overlap each other is checked. In a case where no area overlaps, the process returns to the processing step S200 again, and this processing is continuously performed. Note that the process of checking whether or not the areas overlap each other is preferably performed not only at the current time but also at a future time within a possible range.

According to this measure, at the time of FIG. 5, the respective moving bodies 1 are sufficiently separated from each other, and the occupied area 601 and the preferential area 602 of each moving body 1 do not overlap the occupied area 601 and the preferential area 602 of another person. In such a situation, the exclusion management unit 502 sets, as the occupied area 601 of each moving body 1, the division area that overlaps a predicted position from the current time to the future indicated by the planned route 701 or the prediction motion 702 of each moving body 1 and the range (the size or the standard deviation of the machine body) thereof, and sets the division area adjacent thereto as the preferential area 602. As a result, the respective moving bodies 1 avoid mutual area overlap while performing the respective actions.

Then, when it is determined in the processing step S200 of the flow of FIG. 8 that the areas overlap each other, the process proceeds to a processing step S201, and whether the overlap is in the preferential area or in the occupied area is determined. In a case where the overlap is in the preferential area, the process proceeds to a processing step S202. In a case where the overlap is in the occupied area, the process proceeds to a processing step S203.

In a case where the overlap is in the preferential area, a process is performed as follows in the processing step S202. As this case, for example, FIG. 6 illustrates a state in which the manned machine 1*b* and the worker 1*c* move with respect to the time point of FIG. 5, and the unmanned machine 1*a* has only planned a route and has not yet departed.

Since the unmanned machine 1*a* is stopped, the worker 1*c* tries to pass in front of the unmanned machine 1*a*. In addition, since the unmanned machine 1*a* has already acquired the occupied area 601 and the preferential area 602 in the traveling direction of the worker 1*c*, it is not possible for the worker 1*c* to acquire the occupied area 601 in the range.

In this manner, the exclusion management unit 502 causes the previously acquired moving body 1 to hold the occupied area 601 and the preferential area 602 of the division area. In addition, in a case where a plurality of moving bodies 1 try to enter a new division area at the same time, the moving body 1 having a higher priority can acquire the occupied area 601 or the preferential area 602 associated with the occupied area 601 based on a predetermined priority order. For example, it is conceivable that the priority order is basically set to the order of the worker 1*c*, the manned machine 1*b*, and the unmanned machine 1*a*, and the priority order is further individually assigned in the priority order, but the present example is not limited thereto.

In a case where the overlap is in the occupied area, processing is performed as follows in the processing step S203. As this case, for example, FIG. 7 illustrates a state in which the time further advances from FIG. 6, and illustrates a state in which the unmanned machine 1*a* still remains stopped and the manned machine 1*b* and the worker 1*c* further move in the traveling direction. Since the worker 1*c* has moved toward the occupied area 601 and the preferential area 602 of another person, it is not possible for the worker 1*c* to acquire the occupied area 601 of the worker 1*c*. As a result, the worker 1*c* deviates from the occupied area 601 of the worker 1*c*.

In this case, the worker deviates from the rule that the worker does not go out from the occupied area. The exclusion management unit 502 detects the deviation and transmits rule deviation information to the information presentation unit 401, and transmits a stop command to the unmanned machine 1*a* in the shared area 2. The information presentation unit 401 displays a rule deviation state 703, and the unmanned machine 1*a* that has received the stop command stops autonomous traveling.

As described above, the occupied area 601 is not acquired in a case where the moving body approaches the traveling direction of another moving body 1. If the moving body waits for the passage of the other moving body 1 in the occupied area 601 or selects another course, the moving body can continue the work without stopping the unmanned machine 1*a*. Even in a case where the moving body goes out from the occupied area 601, the risk of an accident is reduced by displaying the rule deviation state 703 to make a user aware of the rule deviation state before entering the occupied area 601 of the other moving body 1 and stopping the autonomous traveling of the unmanned machine 1*a*.

In addition, as in the manned machine 1*b* illustrated in FIGS. 5 to 7, in a course that does not approach another moving body 1, the occupied area 601 is automatically updated in accordance with the movement of the manned machine 1*b*, the manned machine 1*b* can freely move, and the work is not hindered. With such a human-machine cooperative control system, it is possible to prevent a decrease in work efficiency while reducing the risk of an accident.

REFERENCE SIGNS LIST

1 moving body
1*a* unmanned machine
1*b* manned machine
1*c* worker
2 shared area
3 sensor unit
4 information presentation device
5 computer
101 route planning unit
301 moving body position measurement unit
401 information presentation unit
501 moving body motion prediction unit
502 exclusion management unit
601 occupied area
602 preferential area

The invention claimed is:

1. A human-machine cooperative control system configured to exclusively manage respective movable areas of a person and an unmanned machine capable of autonomously moving such that the person and the unmanned machine do not collide with each other in a shared area, the human-machine cooperative control system comprising:

one or more processors and one or more non-transitory computer-readable storage media, the non-transitory computer-readable storage media having stored thereon at least:

a moving body position measurement unit that includes one or a plurality of sensors that measure a position of a moving body including the person and the unmanned machine;

a moving body motion prediction unit that predicts a future motion of a target moving body from the position of the moving body measured by the moving body position measurement unit;

an exclusion management unit that plans a respective movable area of each respective moving body based on a planned route of the unmanned machine and a moving body prediction motion obtained from the moving body motion prediction unit; and an information presentation unit that presents, to a target person, movable area information for a person among respective movable areas of respective moving bodies planned by the exclusion management unit;

wherein for each of the respective moving bodies, the exclusion management unit divides an exclusion management target area in a lattice shape comprising respective divided areas having a predetermined size, and determines the respective movable areas of the respective moving bodies so that the movable areas of the moving bodies do not overlap each other, for each of the divided areas in a minimum unit;

wherein the predetermined size of the divided areas is based on calculation performance of the one or more processors, work efficiency, safety, and a number of moving bodies in the work area;

wherein the exclusion management unit further allocates a preferential area for each respective moving body that surrounds each respective moveable area of each respective moving body, wherein no moving body may allocate or enter a respective preferential area of another moving body;

wherein the exclusion management unit performs continuous overlap determination between the moving bodies including predicting overlap between the moving bodies in future intervals; and wherein the exclusion management unit allocates the respective moveable area of each respective moving body by selecting respective division areas of each respective moving body based on the planned route and the predicted motion, and in a case where a plurality of moving bodies compete for a same division area, determines allocation of the same division area to one of the moving bodies based on a predetermined rule such that the other moving bodies are restricted from entering the same division area, and updates the respective movable areas such that no division area is simultaneously allocated to a plurality of moving bodies.

2. The human-machine cooperative control system according to claim 1, wherein an area deviation prevention function of transmitting, to a target unmanned machine, movable area information for an unmanned machine among the movable areas of the moving bodies planned by the exclusion management unit, and limiting traveling of the unmanned machine so as not to enter an area other than the movable area is provided.

3. The human-machine cooperative control system according to claim 1, wherein the exclusion management unit plans the movable area of each moving body based on the planned route and/or the moving body prediction motion for a predetermined time length with respect to the planned route of the unmanned machine and the moving body prediction motion obtained from the moving body motion prediction unit.

4. The human-machine cooperative control system according to claim 1, wherein, in a first case where the planned route and/or the moving body prediction motion overlaps in the same division area, and in a second case where the division area has already been allocated as a movable area of any unmanned machine or moving body, the exclusion management unit continuously determines the division area as the movable area with respect to the unmanned machine or the moving body.

5. The human-machine cooperative control system according to claim 1, wherein the exclusion management unit changes a size of a division area allocated as the movable area of for each moving body based on an attribute and action history information of the moving body.

6. The human-machine cooperative control system according to claim 1, wherein the information presentation unit displays information by projecting an image or a video onto a ground by a projector.

7. The human-machine cooperative control system according to claim 1, wherein the information presentation unit displays information by switching light-emitting of a light-emittance object buried in a ground.

8. The human-machine cooperative control system according to claim 1, wherein the information presentation unit displays information by displaying an image or a video on a display device of a person.

9. The human-machine cooperative control system of claim 1, wherein the exclusion management unit executes a first avoidance action in a case where the respective moving areas of the respective moving bodies overlap and executes a second avoidance action in a case where the respective preferential areas of the respective moving bodies overlap.

10. A human-machine cooperative control method for exclusively managing each movable area such that a person and an unmanned machine capable of autonomously moving do not collide with each other in a shared area, the human-machine cooperative control method comprising:

measuring a position of a moving body including the person and the unmanned machine;

predicting a future motion of a target moving body from the position of the moving body;

planning a respective movable area of each respective moving body based on a planned route and a moving body prediction motion of the unmanned machine;

presenting, to a target person, movable area information for a person among respective movable areas of respective moving bodies;

for each of the respective moving bodies, dividing an exclusion management target area into a lattice shape comprising respective division areas having a predetermined size, and determining the respective movable areas of the respective moving bodies so that the movable areas of the moving bodies do not overlap each other, for each of the divided areas in a minimum unit;

basing the predetermined size of the divided areas on calculation performance of a processor performing the method, work efficiency, safety, and a number of moving bodies in the work area;

wherein the respective movable areas include respective occupied areas set along a course of each respective moving body and respective preferential areas set around each respective occupied area such that no moving body may allocate or enter a respective preferential area of another moving body, performing continuous overlap determination between the moving bodies including predicting overlap between the moving bodies in future intervals;

allocating the respective moveable area of each respective moving body by selecting respective division areas of each respective moving body based on the planned route and the predicted motion, and in a case where a plurality of moving bodies compete for a same division area, determining allocation of the same division area to one of the moving bodies based on a predetermined rule such that the other moving bodies are restricted from entering the same division area, and updating the respective movable areas such that no division area is simultaneously allocated to a plurality of moving bodies.

11. The human-machine cooperative control method according to claim 10, wherein when movable areas of a plurality of the moving bodies do not overlap each other, the plurality of the moving bodies are movable within the shared area without limitation.

12. The human-machine cooperative control method according to claim 11, wherein, when occupied areas for the plurality of moving bodies overlap each other, the unmanned machine is stopped.

13. The human-machine cooperative control method according to claim 10, further comprising executing a first avoidance action in a case where the respective moving areas of the respective moving bodies overlap and executing a second avoidance action in a case where the respective preferential areas of the respective moving bodies overlap.

* * * * *